Patented May 11, 1948

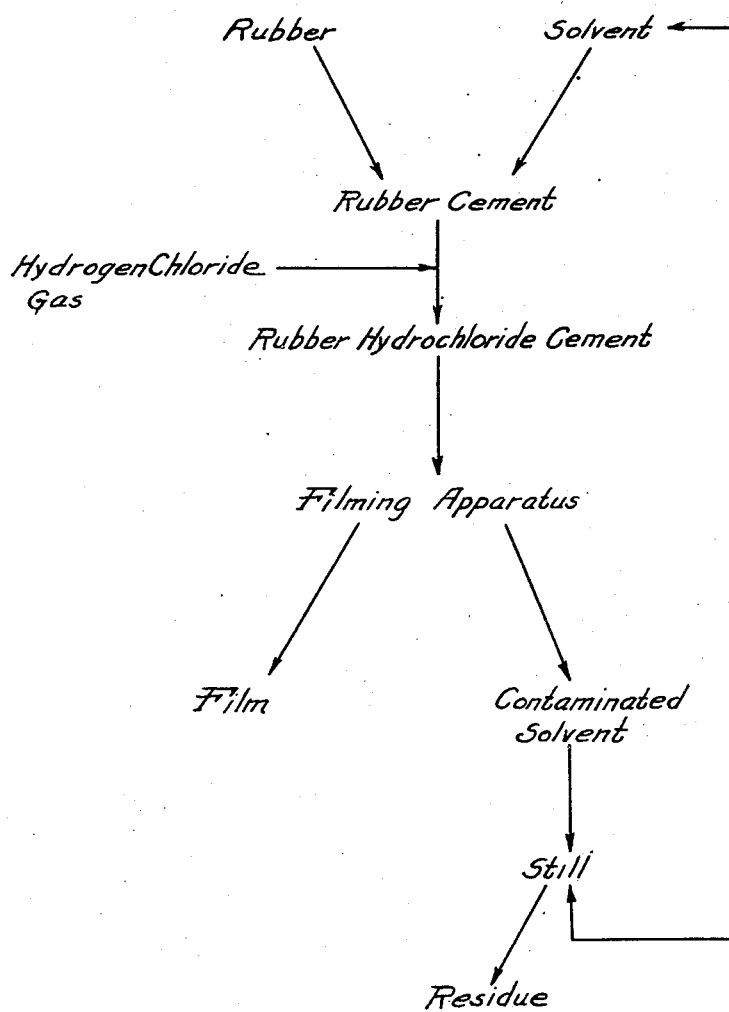

2,441,328

UNITED STATES PATENT OFFICE 2,441,328

RUBBER HYDROCHLORIDE FILM

Harold Judson Osterhof, Cuyahoga Falls, Ohio, assignor to Wingfoot Corporation, Akron, Ohio, a corporation of Delaware Application May 20, 1943, Serial No. 487,723

8 Claims. (Cl. 260—771)

This invention relates to the manufacture of rubber hydrochloride film. More particularly, it relates to the reuse in the process of solvent recovered in the manufacture of film.

Rubber hydrochloride film has been made by dissolving rubber in a low-boiling solvent, such as benzene or chloroform, etc.; gassing the cement with hydrogen chloride gas to form rubber hydrochloride; and then after purification of the resulting rubber hydrochloride cement by neutralization, etc., casting the cement as a film and evaporating the solvent. For most purposes, the solvent recovered can be reused for the solution of further quantities of rubber for the manufacture of rubber cement so that the process is cyclic. However, it has been found that the film so produced contains a contaminating material, herein referred to as the contaminant, which has a deleterious effect on the flavor of foodstuffs packaged in the film. For instance, process cheese filled into a bag of such film while the cheese is hot and fluid acquires an off taste due to the contaminant. It similarly affects other foods packaged in the film, such as milk, nuts, etc.

It appears from a careful study of this situation that the contaminant is an ingredient or the reaction product of an ingredient which occurs naturally in rubber. Although it has a relatively high boiling point, its vapor pressure is such that it is largely evaporated from the cast film with the solvent and is collected as an impurity in the recovered solvent. The solvent may, for example, be recovered in an absorbent charcoal, solvent recovery system or any type of condenser. If an absorbent charcoal, solvent recovery system is used, the solvent will be recovered for reuse in the usual manner; viz., by steam distillation. The contaminant is probably composed of phenolic materials occurring naturally in the rubber and may comprise amine decomposition products resulting from hydrolysis of the protein. It is also possible that it may contain sterols or other natural antioxidant present in the rubber.

According to the present invention, the contaminant is removed from the cycle by distilling the recovered solvent before reuse at its boiling point or at a temperature approaching its boiling point. The contaminant is collected in the distillation residue, which is discarded. The condensed distillate is free from the contaminant or sufficiently free from the contaminant to be reused.

The process is illustrated in the accompanying flow sheet. This shows the use of solvent to dissolve the rubber to produce rubber cement. This rubber cement is gassed with hydrogen chloride to produce the rubber hydrochloride cement. This cement is cast as film in the film apparatus, and the contaminated solvent which is volatilized from the film is recovered. It is subsequently subjected to a distillation process to separate the contaminant as residue and recover purified solvent for reuse in the process.

In general, the solvent may be reused once or twice without distillation without affecting the desirability of the resulting film for food packaging. The difficulty is not due to the contamination of the film from impurity present in the original solvent employed: it is due to the failure of all the high-boiling contaminant to volatilize with the solvent in the drying of the film when the amount of contaminant naturally present in the rubber is augmented by additional contaminant present in the solvent from its previous use. There is contaminant present in the rubber, and this, of course, is carried over into the rubber hydrochloride cement. If the solvent used is free from contaminant or relatively free from contaminant, sufficient of the contaminant present in the rubber hydrochloride cement will be volatilized from the rubber hydrochloride in the filming apparatus to yield a film which may be used in the packaging of foodstuffs without imparting an off flavor to them. If too high a concentration of the contaminant is built up in the rubber hydrochloride cement by the reuse of contaminant-containing solvent, it is not all separated from the film in the filming and drying apparatus, but sufficient of the contaminant is left in the film to make it undesirable for food packaging. Even with the final stages of the film drier maintained at about 200° F., sufficient of the contaminant remains in the film to contaminate foodstuffs packaged in it if too high a percentage of the contaminant is present in the rubber hydrochloride cement. The film may be removed from the drier and heated in air for some six to eight or more hours to remove the contaminant, but ordinarily this is not practical. The preferred method of operation is to use solvent sufficiently low in contaminant to allow volatilization of the contaminant from the rubber hydrochloride along with the solvent in the filming apparatus.

This application is a continuation of my application Serial No. 360,547, filed October 10, 1940, now abandoned.

What I claim is:

1. In the cyclic process of producing rubber hydrochloride film for use in the packaging of foodstuffs by dissolving rubber in a solvent, gassing the cement thus produced to form a rubber hydrochloride cement (which contains a high-boiling contaminant), producing film from a cement of the rubber hydrochloride so formed by evaporating said solvent therefrom, and recovering and reusing said solvent to complete the cycle, the improvement which consists of distilling the recovered solvent before reuse to remove at least the greater portion of said contaminant therefrom.

2. The method of preventing the concentration of impurities above the taste level in rubber hydrochloride film by distilling the solvent evaporated from a cast solution of the rubber hydrochloride prior to the reuse of said solvent, which comprises casting a solution of the rubber hydrochloride and evaporating solvent therefrom to produce rubber hydrochloride film, distilling evaporated solvent to separate high boiling residue therefrom, and then reusing the solvent for the preparation of a further solution of rubber hydrochloride to be cast as film.

3. The process of preventing the concentration of impurities in a cyclic process of producing rubber hydrochloride film which comprises dissolving rubber in a solvent, hydrochlorinating the solution, casting film therefrom, and evaporating solvent to produce a film of rubber hydrochloride, recovering the solvent, distilling the recovered solvent to separate it from high boiling residue contained therein, and reusing the solvent for solution of further rubber for repetition of the process.

4. That improvement in the cyclic process of producing rubber hydrochloride by dissolving rubber which contains an ingredient naturally occurring therein which after hydrochlorination and neutralization becomes a taste-imparting impurity which when the rubber solution has been hydrochlorinated and neutralized and then cast as a film and subjected to evaporating conditions will evaporate to at least some extent with the solvent and be recovered as a taste-imparting impurity in the condensate, which impurity on cyclic reuse of the condensate as a solvent for further rubber will build up in the solvent to such a level that on evaporation of the solvent from the cast rubber hydrochloride film, sufficient impurity will remain in the film to cause it to contaminate materials packaged in the film, which improvement comprises separating said impurity from the solvent by distillation of the solvent therefrom before the impurity content of the solvent has reached the aforesaid level.

5. The improvement in the cyclic process of producing rubber hydrochloride film in which a solution in benzene is produced from rubber and an ingredient naturally occurring in rubber, which on hydrochlorination and neutralization yields a taste-imparting impurity, the solution then being hydrochlorinated and neutralized, with subsequent casting of the solution as a film with eventual heating of the film to about 200° F. to evaporate the benzene from the film with simultaneous removal of some of the taste-imparting impurity, with condensation of the vapors thus produced to obtain benzene with a content of the impurity which on cyclic reuse of the benzene will ultimately reach a concentration such that there remains in the film on such heating at about 200° F. sufficient impurity to contaminate material packaged therein, which improvement consists in separating said impurity from the benzene by distillation of the benzene therefrom before reuse of the solvent so as to keep the impurity content of the solvent low enough to maintain the level of the impurity in the film below that at which products packaged therein become contaminated thereby.

6. The cyclic process of producing rubber hydrochloride film which comprises dissolving in benzene rubber and an ingredient naturally occurring in rubber which on hydrochlorination and neutralization yields a taste-imparting impurity, then hydrochlorinating and neutralizing the resulting hydrochlorinated solution, casting the solution as a film, evaporating solvent from the film, and heating the film at about 200° F. to drive out the benzene therefrom and simultaneously removing at least some of the taste-imparting impurity from the film, condensing the benzene and taste-imparting impurity and then before reuse of the benzene in the cyclic production of rubber hydrochloride film distilling the mixture of benzene and impurity to separate the benzene from the impurity and then reusing the benzene in the cyclic process.

7. The cyclic method of producing rubber hydrochloride film with lessening of the content therein of a taste-imparting impurity produced from an ingredient naturally occurring in rubber, by hydrochlorination and then neutralization thereof, which comprises dissolving rubber containing said ingredient, hydrochlorinating, and then neutralizing the solution, casting a film from the resulting solution, evaporating solvent from the film, and heating the film to facilitate such evaporation and simultaneously volatilizing from the film the taste-imparting impurity, condensing the resulting vapors to recover the solvent and condensing therewith the impurity, and thereafter separating the impurity by distillation of the solvent therefrom and reusing the solvent for solution of further rubber.

8. The cyclic method of producing rubber hydrochloride film while maintaining below an objectionable level the content therein of a taste-imparting impurity produced by hydrochlorinating and then neutralizing an ingredient naturally occurring in rubber, which comprises dissolving in benzene the rubber and said ingredient, hydrochlorinating and then neutralizing the solution, casting a film from the resulting solution, evaporating the benzene from the film while at a temperature of about 200° F. and simultaneously volatilizing at least some of the taste-imparting impurity from the film, condensing the resulting vapors to obtain benzene contaminated with the impurity, and reusing the benzene for solution of further rubber containing the impurity; and redistilling said benzene before reuse to separate the same from at least some of the impurity to maintain the content of the taste-imparting impurity in the film below said level.

HAROLD JUDSON OSTERHOF.

REFERENCES CITED

The following references are of record in the file of this patent:

UNITED STATES PATENTS

| Number | Name | Date |
|---|---|---|
| 2,067,971 | Leach et al. | Jan. 19, 1937 |
| 2,078,526 | Calvert | Apr. 27, 1937 |
| 2,134,172 | Calvert | Oct. 25, 1938 |
| 2,161,454 | Calvert | June 6, 1939 |